Feb. 2, 1937. G. A. TIEDE 2,069,661
FISHING TACKLE CARRIER
Filed June 28, 1935 2 Sheets-Sheet 1

INVENTOR
G. A TIEDE.
BY

Feb. 2, 1937. G. A. TIEDE 2,069,661
FISHING TACKLE CARRIER
Filed June 28, 1935  2 Sheets-Sheet 2
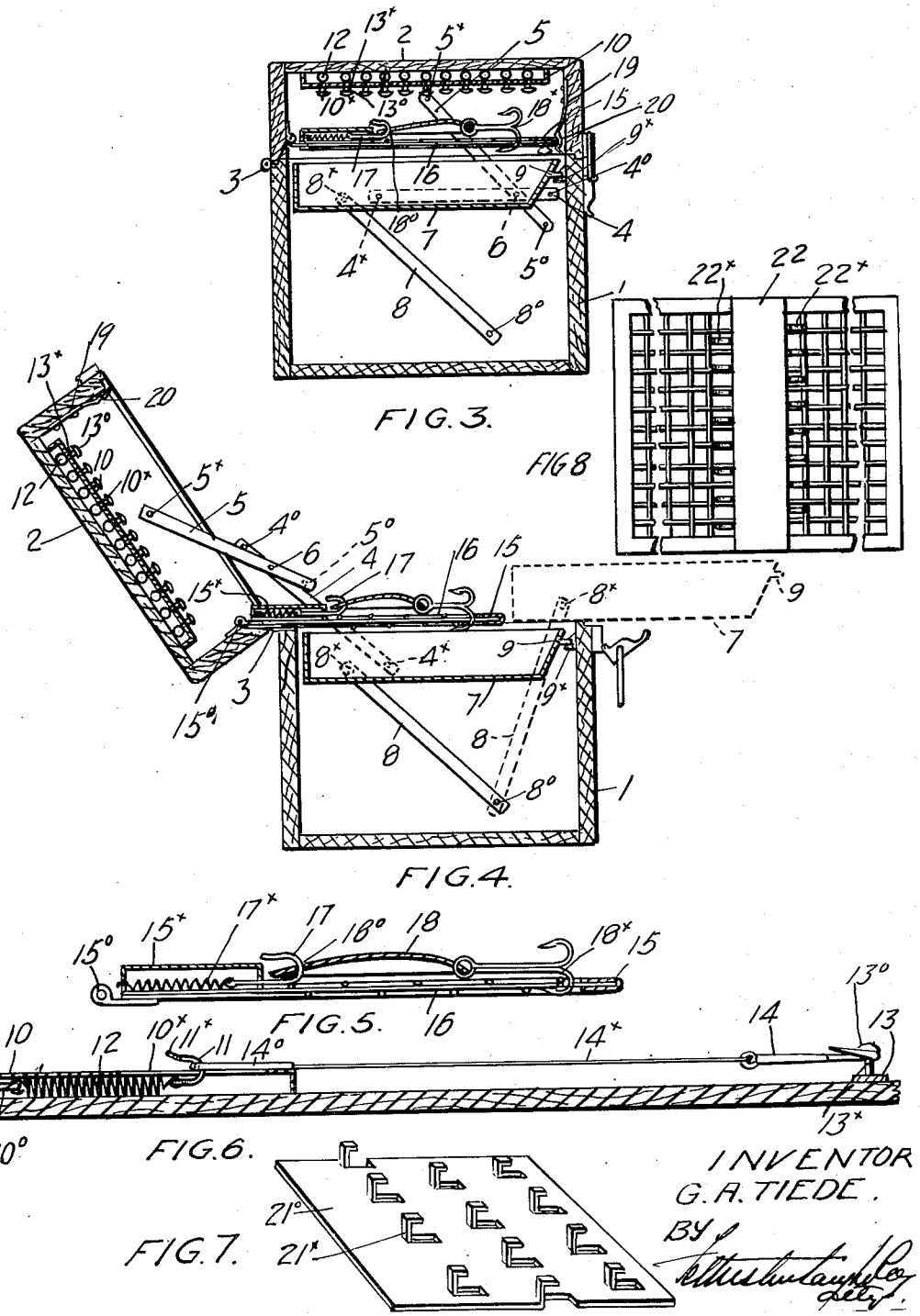
INVENTOR
G. A. TIEDE.

Patented Feb. 2, 1937

2,069,661

UNITED STATES PATENT OFFICE 2,069,661

FISHING TACKLE CARRIER

George Albert Tiede, London, Ontario, Canada

Application June 28, 1935, Serial No. 28,915

1 Claim. (Cl. 43—31)

My invention relates to improvements in fishing tackle carriers, and the object of the invention is to devise a carrier in which all kinds of fishing tackle may be held without danger of spoiling, without confusion by the hooks getting tangled and in which each article is held so that it can be readily and easily picked out whenever required without loss of time and in which the gut to which the hooks are secured is held constantly stretched so that there is no danger of their crimping rendering them unfit for use, and it consists essentially of the arrangement and construction of parts as hereinafter explained.

Fig. 3 is a cross sectional view through the closed carrier.

Fig. 4 is a similar view to Fig. 3 shown in the open position, the forward position of the tray being shown in dotted lines.

Fig. 5 is an enlarged sectional detail of the spoon bait holder.

Fig. 6 is an enlarged sectional detail of the fish hook holder.

Fig. 7 shows an alternative form of hook engaging plate.

Fig. 8 shows an alternative form of reticulated member intermediately broken away of its length.

In the drawings like characters of reference indicate corresponding parts in each figure.

Figure 1:
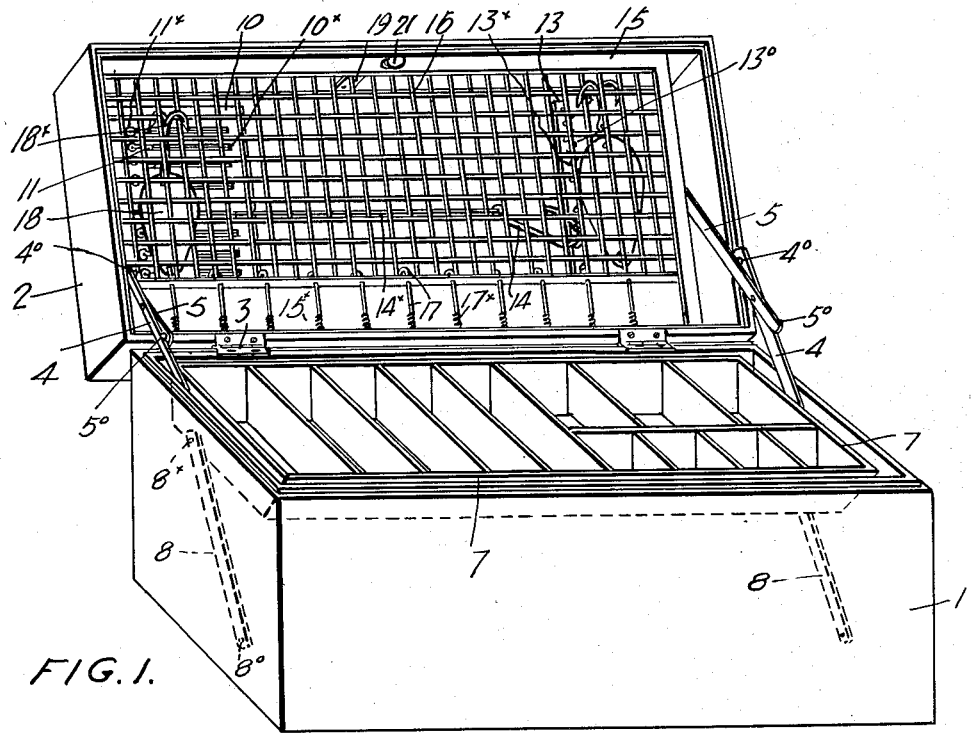
Fig. 1 is a perspective view of my carrier with the lid raised.

1 indicates the body of the cabinet forming my carrier, 2 the cover hinged at 3 to the body 1 and 4 and 5 strut members pivoted respectively to the body and cover at $4^x$ and $5^x$ and together at 6 and having engaging stops $4^o$ and $5^o$ indicated in Fig. 4 to hold the cover definitely in a position most convenient for removing the tackle therefrom.

7 is a tray which is suitably divided into compartments for receiving various articles needed in fishing. The tray 7 is pivotally mounted at $8^x$ at each end on struts 8 pivoted at $8^o$ to the end wall of the body 1. The forward end of the tray is supported by a pin 9 extending therefrom and resting in its supporting position in a socket $9^x$. The tray 7 may be lifted forward to the dotted position and supported on the front wall of the body 1 so that the contents beneath the tray may be got at.

10 is a casing secured to the inner face of the cover top at one end and provided with a series of parallel slots $10^x$. 11 are hooks extending through the slots $10^x$ and provided with enlarged outer ends $11^x$. 12 are tension springs connected at one end to the hooks 11 and at the opposite end to the rib $10^o$ extending from the outer end wall of the casing 10.

13 is a plate bar secured to the top of the cover 2 adjacent the opposite end thereof and from which extend a series of stud pins $13^x$ preferably provided with heads $13^o$. 14 is a fish hook to which is attached the usual gut $14^x$ and loop $14^o$.

In order to secure the fish hook in place, the loop $14^o$ is engaged with the hook 11 and the spring 12 drawn thereby into tension to allow of the hook 14 being passed around the pin $13^x$. By this means the gut or the equivalent part is drawn and held taut so that it cannot possibly become crimped and is, therefore, always in good shape for use.

A leaf formed by the U-shaped frame portion 15 and the casing $15^x$ connecting the side arms of the frame together and hinged at $15^o$ to the cover 2 is provided with a reticulated portion 16. 17 are a series of hooks and $17^x$ are tension springs resiliently holding the hooks 17. 18 are spoon baits provided with the usual hooks $18^x$. $18^o$ is a perforation formed in the other end of the spoon.

When placing the spoons within the carrier, one of the hooks 17 is passed through the perforation $18^o$ and the spring $17^x$ drawn into tension. One of the hooks $18^x$ is then passed through one of the openings of the reticulated portion 16, the contraction of the spring $17^x$ then drawing the hook $18^x$ and spoon 18 firmly in alignment with the face of the leaf 15, $15^x$.

19 is a spring finger having a notch or recess 20 engaging the edge of the frame 15 and 21 is a knob by which the frame edge is pulled clear of the notch 20.

In Fig. 7, I have shown an alternative form of hook engaging means comprising a plate $21^o$ which is secured inside the lid in place of the bar 13 and from which are stamped up the hook projections $21^x$ so arranged as to accommodate the hooks of tackle of various lengths, the fish hooks engaging the projections $21^x$ in the same manner as they engage the pins $13^x$.

Figure 2:
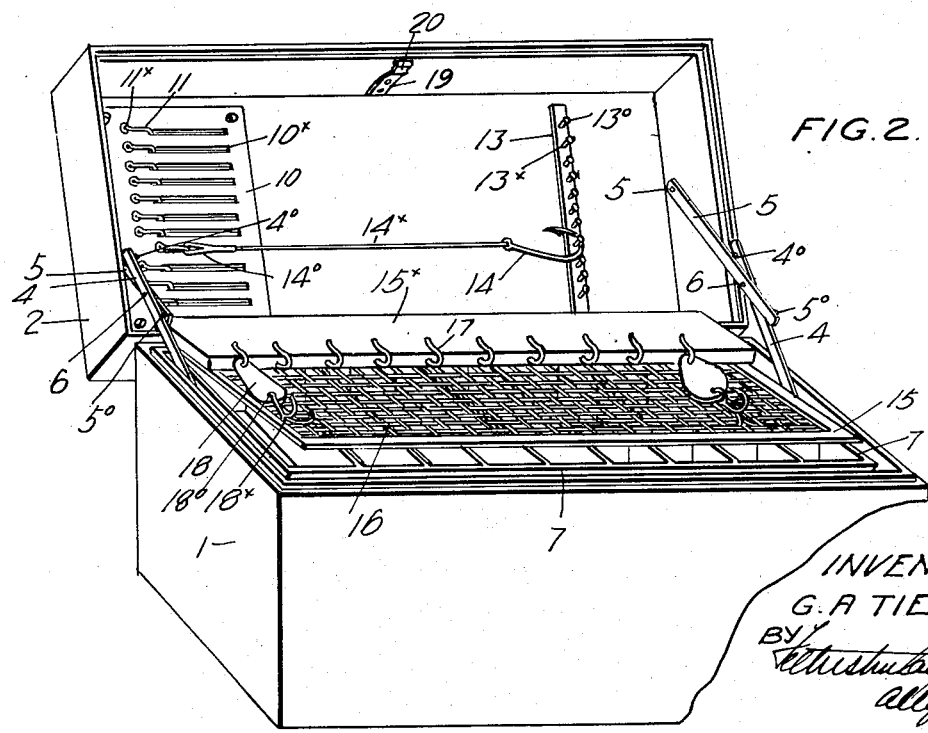
Fig. 2 is a similar view to Fig. 1 showing the leaf carrying the spoon baits swung so as to allow of the removal of a spoon bait or hook.

In Fig. 8, I have shown an alternative construction of the reticulated member in which the casing 22 corresponding to the casing $15^x$ of Figs. 1 to 5 is arranged transversely and centrally of the reticulated member, the spring held hooks $22^x$ extending from each side thereof and preferably staggered one in relation to the other permitting the holding of a very much longer bait.

From this description it will be seen that I have devised a carrier for tackle in which the contents will be firmly and compactly held without any confusion and in such a way that any desired article may be immediately seen and removed therefrom without loss of time and in which they will be held without injury and without danger of being mislaid.

What I claim as my invention is:—

A fishing tackle comprising a casing body and cover, a supplemental casing secured within the cover and having longitudinal parallel slots therein, a spring secured at one end within the supplemental casing and extending beneath each slot, a hook secured to the opposite end of the spring and extending through the slot to engage one end of a fishing tackle, and a pin in a line with each slot and located at the opposite end of the cover around which the tackle hook is adapted to extend to hold the tackle in stretched position.

GEORGE ALBERT TIEDE.